United States Patent
Waksman

(10) Patent No.: US 7,443,544 B2
(45) Date of Patent: Oct. 28, 2008

(54) ACCELERATING COLOR CONVERSION USING A TEMPORARY PALETTE CACHE

(75) Inventor: Peter Waksman, Concord, MA (US)

(73) Assignee: Zoran Corporation, Sunnyvale, CA (US)

(*) Notice: Subject to any disclaimer, the term of this patent is extended or adjusted under 35 U.S.C. 154(b) by 566 days.

(21) Appl. No.: 10/000,461

(22) Filed: Nov. 30, 2001

(65) Prior Publication Data

US 2002/0126312 A1  Sep. 12, 2002

Related U.S. Application Data

(60) Provisional application No. 60/250,729, filed on Dec. 1, 2000.

(51) Int. Cl.
*G06K 15/00* (2006.01)
*H04N 1/40* (2006.01)

(52) U.S. Cl. ..................... 358/3.23; 358/3.01

(58) Field of Classification Search .......... 358/1.9, 358/2.1, 3.01, 3.23, 1.1; 382/167; 345/1.1, 345/604

See application file for complete search history.

(56) References Cited

U.S. PATENT DOCUMENTS

| | | | | |
|---|---|---|---|---|
| 5,502,458 A | * | 3/1996 | Braudaway et al. | 345/593 |
| 5,579,031 A | * | 11/1996 | Liang | 345/604 |
| 5,668,890 A | * | 9/1997 | Winkelman | 382/167 |
| 6,522,783 B1 | * | 2/2003 | Zeng et al. | 382/239 |

* cited by examiner

*Primary Examiner*—Edward L. Coles
*Assistant Examiner*—James A Thompson
(74) *Attorney, Agent, or Firm*—Darby & Darby P.C.; John W. Branch

(57) ABSTRACT

A method and device for accelerating a color conversion process that converts input image data corresponding to a first color space to output image data corresponding to an output color space. A temporary cache stores color information in an array, and performs a conversion calculation for each individual color combination. If a pixel corresponds to a new color combination, the pixel information is stored in a new index of the array. If the pixel repeats a previously processed color, the pixel information is stored in the same index of the array as the previously processed pixel. A color conversion calculation is performed after all pixels within a block of pixels are mapped to the temporary array.

27 Claims, 5 Drawing Sheets

ACCELERATING COLOR CONVERSION USING A TEMPORARY PALETTE CACHE

RELATED APPLICATIONS

This application claims priority to U.S. Provisional Patent Application Ser. No. 60/250,729 filed on Dec. 1, 2000, incorporated herein in its entirety by reference.

BACKGROUND

The present invention relates to a color image processing method and electronic color conversion device for receiving color image data corresponding to an arbitrary color space, processing the image data, and outputting the image data to a color image forming device in an output color space.

In a conventional image forming device, such as a color printer, color image data received from a host computer, monitor, scanner, or other image-generating device, is in the form of an input color space. Typically, each color in the input image is represented by a three-dimensional coordinate system, such as Red (R), Green (G), and Blue (B). The additive RGB color space is suitable for forming and viewing an image on a computer monitor. Each pixel in the image is represented by 24-bit data, consisting of 3 eight-bit bytes, where each byte component corresponds to a primary color of the color space. For the RGB color space, each pixel in the computer monitor can be represented with a combination of numerical values of Red, Green and Blue (R, G, B). The numerical value is one of 256 values, ranging from 0 to 255, that represents a level of the respective color component in the pixel. For example, a purely red pixel comprising an image on a computer screen will have the coordinates (255, 0, 0). In addition, input image data may correspond to a grey-scale color space. In this color space, each pixel is represented by one of 256 levels of intensity, ranging from 0 to 255. Each level represents an increment of grey between black (0) and white (255).

Generally, color images are formed using a subtractive CMY color space. Cyan (C), Magenta (M), and Yellow (Y) are the complementary colors of Red (R), Green (G) and Blue (B), respectively, and are used as the colors of the ink or toner in forming a hard copy of the image. Each combination of (R, G, B) in the input image corresponds to a combination of Cyan (C), Magenta (M) and Yellow (Y) in the output color image. In addition, Black (K) is often included with a CMY color space when forming images. In this case, the output color space is a CMYK color space. An alternate output color space for printing images is a grey-scale color space.

In order to form image data having the color spaces intended by a user, conversion from an input color space to an output color space must be performed. This involves converting data in the (R, G, B) color space to the (C, M, Y) or (C, M, Y, K) color space for most applications. An image-producing apparatus converts the input brightness RGB signals or signals having another color space, into density data in the (C, M, Y), (C, M, Y, K) or other output color space. Conventionally, this is done on a pixel by pixel basis using a conversion means. The conversion means usually includes a look-up table circuit, comprising a database indicating the coordinates of an output color space combination for a given input color space combination. The look-up table circuit performs a conversion calculation for each of the (R, G, B) image data.

The color conversion process is complicated and time-consuming. Every pixel must be individually processed and converted on a pixel by pixel basis. Even if neighboring pixels undergo the same conversion operation, the calculation must be repeated for every new pixel. This causes redundant calculations to be performed for pixels having the exact same combination of color values.

SUMMARY

The present invention streamlines the color conversion process in an image processing device, particularly for images with many repeated colors. The color conversion process is accelerated by using a temporary palette cache for pre-converted pixel values. The illustrative embodiment of the invention creates a mapping from input pixels to positions (indices) of a temporary input palette, followed by a color conversion of the entire palette to an output palette in an output color space. The output pixels are reconstructed using the same indices of the input palette. As a result, the conversion is performed with greater efficiency. Rather than performing the color conversion calculation on each and every pixel, the illustrative embodiment performs a mass color conversion for each separate color combination only. The color conversion calculation is not repeated for different pixels within a pixel block having the same color. In this manner, the number of calculations is reduced.

According to an illustrative embodiment, the input color space includes Red, Green, and Blue (RGB), and the output color space includes Cyan, Magenta, and Yellow (CMY).

In an alternate embodiment, the input color space includes Red, Green, and Blue (RGB), and the output color space includes Cyan, Magenta, Yellow, and Black (CMYK).

In another embodiment, the input color space is a grey-scale color space.

In yet another embodiment, the output color space is a grey-scale color space.

DRAWINGS

DETAILED DESCRIPTION

Figure 1:
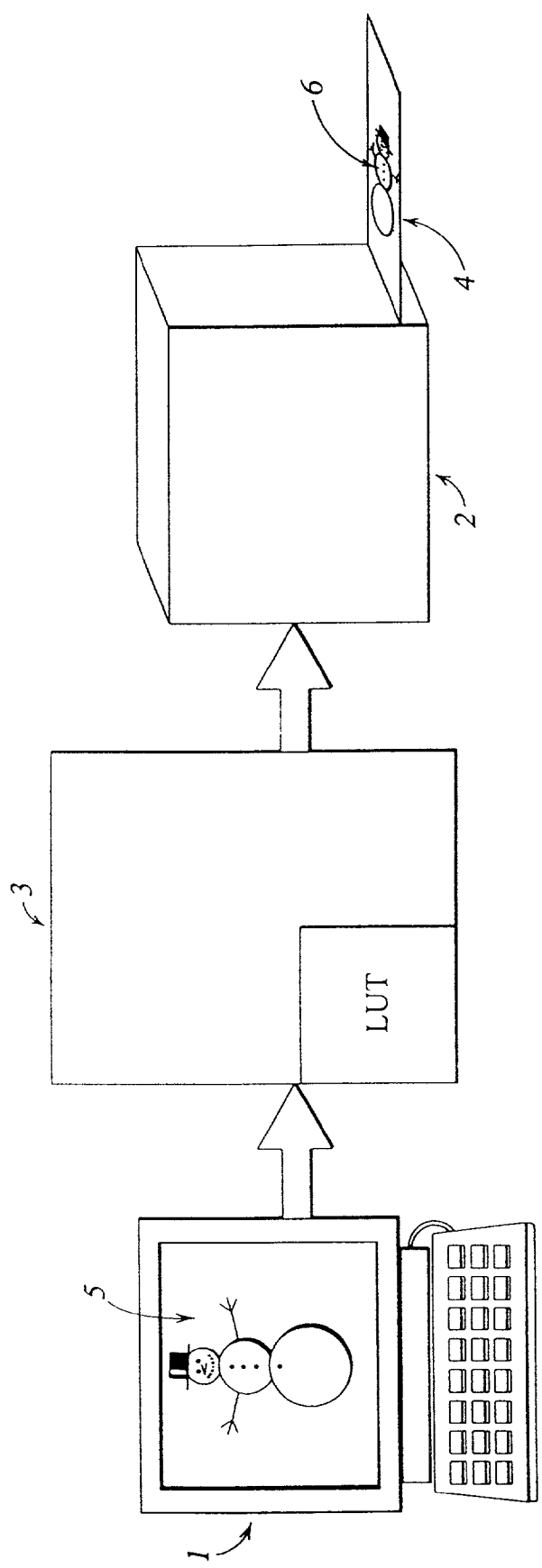
FIG. 1 is a block diagram of an image processing system suitable for implementing the accelerated color conversion process of the present invention.

FIG. 1 is a block diagram of a color image processing system used in a typical application and in which the present invention is implemented. The image processing system is configured to operate on a standard computer system and receives multileveled color image data from a host computer 1 or other image-generating device. The image 5 shown on a computer screen is held in the form of raster image data, which describes the image in terms of groups of pixels. Color image data is formed in the memory of the host computer 1, and then transmitted to an image forming unit, such as a color printer 2. According to an alternate embodiment, the image forming unit is a copier or other suitable electronic device for forming images. As discussed, this input image data consists of RGB data or data in another input color space. A processor 3 reads the contents of the image 5 and performs color space conversion of the RGB components into CMY or CMYK color components (or the ink colors of the image forming unit). The processor 3 writes the result in the image memory in order to print a copy 6 of the image on a print medium 4.

Figure 2:
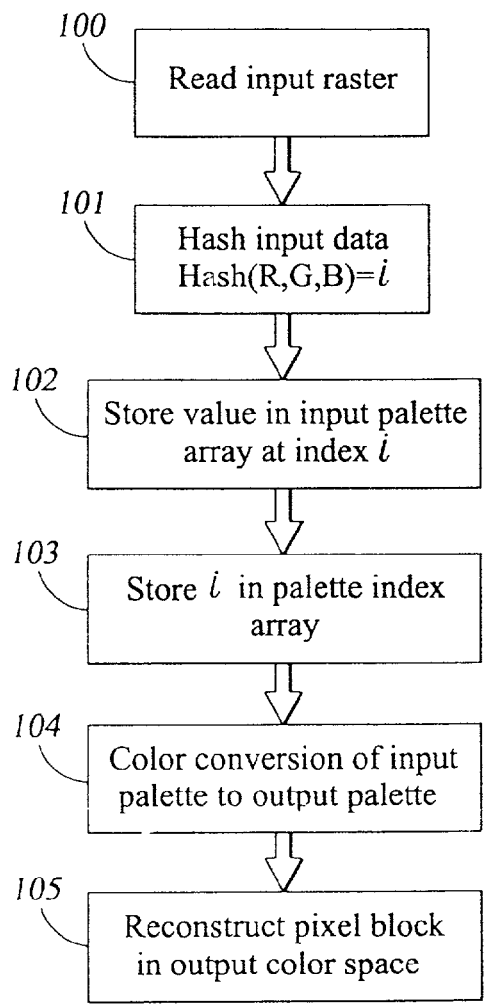
FIG. 2 is a flowchart illustrating the accelerated color conversion process according to the teachings of the present invention.
Figure 3A:
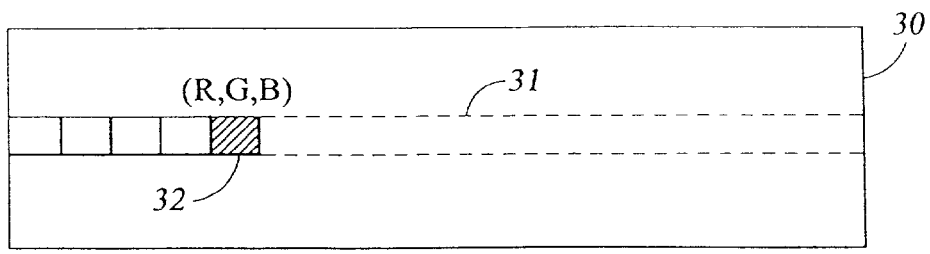
FIG. 3a depicts an original pixel block in an input image.
Figure 3B:
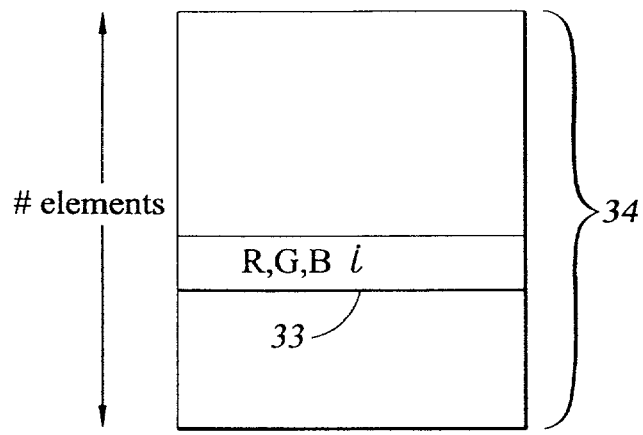
FIG. 3b shows a hash table used in the present invention for storing an input color space value from the original image and a hash value.

The accelerated color conversion process of the present invention is illustrated in FIG. 2. FIG. 2 is a schematic flowchart diagramming the conversion steps using a temporary palette cache. While the illustrative embodiment described involves converting from an RGB color space to a CMY color space, it is understood that the principles involved may be applied to any conversion from a first color space to a second color space. For example, either the input color space or the output color space may be a grey-scale color space. The first step in the color conversion process is to read an input raster (step 100), usually comprised of a row of pixels in the computergenerated image. FIG. 3a illustrates an original pixel block 30 for the unconverted original image. A "hash" function is then applied to the input raster 31 for each (R, G, B) pixel 32 in the one-dimensional array (step 101). A "hash" function in computer programming is a process of converting a record key value into a "random" but consistent index value for storing or retrieving the record. In this case, the function HASH(R,G,B) gives an entry 33 into a hash table 34, shown in FIG. 3b. The HASH( ) function maps the 24-bit Red, Green, Blue triples into 8-bit indices, in order to store the RGB information within a 256 element indexed space. A sample HASH( ) function may be defined according to the following equation:

$$HASH(R,G,B) = \{(R+(G<<3)+(B<<6))+((R+(G<<3)+(B<<6))>>8)\} \& \text{ (hashmask)}$$

An alternate equation for a color space with four input components, including Red, Green, Blue, and one additional component (X), would be:

$$HASH4(R, G, B, X) = \{(R + (G<<2) + (B<<4) + (X<<6)) + ((R + (G<<2) + (B<<4) + (X<<6)) >> 8)\} \& \text{ (hashmask)}$$

This function has the property of using up as much of the hash table 8-bit index range (0 to 255) as possible. (The element "hashmask" defines the upper limit of the range). In addition, it maps similar RGB values to different places in the 256-element index range.

Figure 3C:
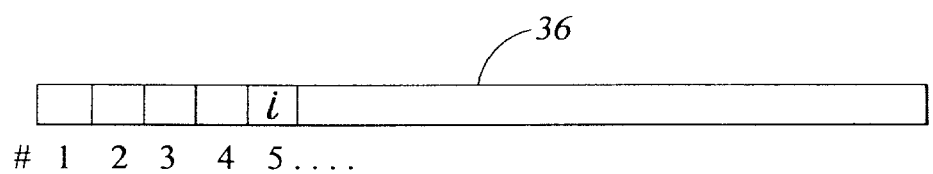
FIG. 3c shows a palette index array for storing a hash value at the same index as the pixel of the original pixel block that corresponds to the hash value.
Figure 3D:
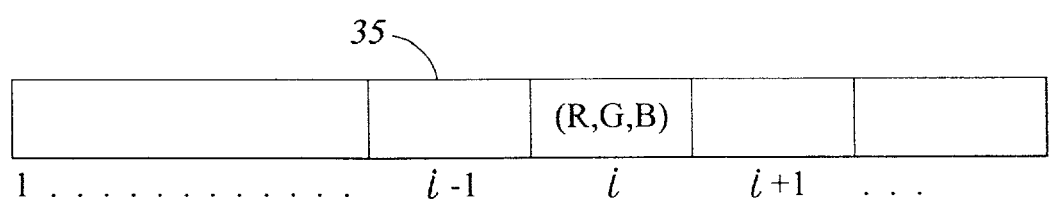
FIG. 3d shows an input palette containing the input image data mapped to indices.

If the processed pixel 32 corresponds to a new color in the raster 31, the "hash" function will provide a new entry 33 in the hash table 34. The entry of the hash table contains an index "i" for a temporary input palette 35, illustrated in FIG. 3d. The (R, G, B) value of the pixel 32 is stored in the input palette at index position "i" (step 102). Redundant (R, G, B) values in the original image raster 31 are stored at the same index of the input palette 35, since they will generate the same hash value and lead to the same hash table entry 33. Therefore, only unique representative colors, without duplications, are contained in the input palette 35. The hash table index "i" is also stored in a palette index array 36, at the same position as the original pixel 32 (step 103). The palette index array 36 is the same length as the input raster 31, and serves as a key for the mapping of the (R, G, B) data into the input palette 35. The palette index array 36 is illustrated in FIG. 3c. For example, if tenth RGB pixel in the input raster with the coordinates (50, 50, 0) gives a hash value of 116, the RGB value (50, 50, 0) will be stored in the hash table along with a hash index value of 116. The tenth entry in the palette index array is registered as 116. In the input palette, the RGB value (50, 50, 0) is stored at index 116.

Figure 3E:
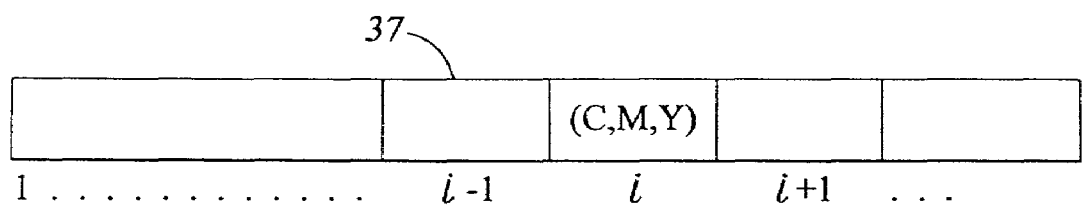
FIG. 3e shows an output palette of converted data values.

After the entire raster 31 is mapped to the input palette 35, the RGBs of the input palette are converted to CMYs as a singer raster color conversion (step 104). As discussed above, the RGBs can also convert to CMYKs, or data in another output color space. The color conversion is accomplished by any known technique in the art, such as utilizing a look-up table stored in memory to convert each input color to an output color in the output color space. The result is an output palette 37, illustrated in FIG. 3e, of the same length as the input palette 35, where each index contains an element in the output color space that corresponds to an element in the input color space at the same index of the input palette.

Figure 3F:
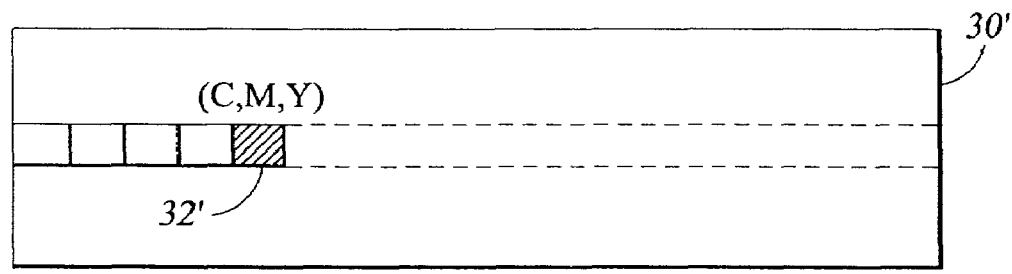
FIG. 3f shows the color converted pixel block of the output image.

After the color conversion of the input palette to the output palette, each RGB combination 32 in the original raster 31 is replaced with the index "i", stored in a corresponding position in the palette index array 36 in step 105 of FIG. 2. Finally, each "i" in the original raster 31 is replaced with the CMY or other combination stored in the output palette 37 at index "i" (OutPalette[i]). In this manner, a block of pixels in the image is reconstructed in the output color space using the pixel location and the stored index. The converted pixel block 30' for the output image is illustrated in FIG. 3f. Each pixel 32' in the output color space corresponds to a pixel 32 of the input image having the same position in the pixel block.

Figure 4:
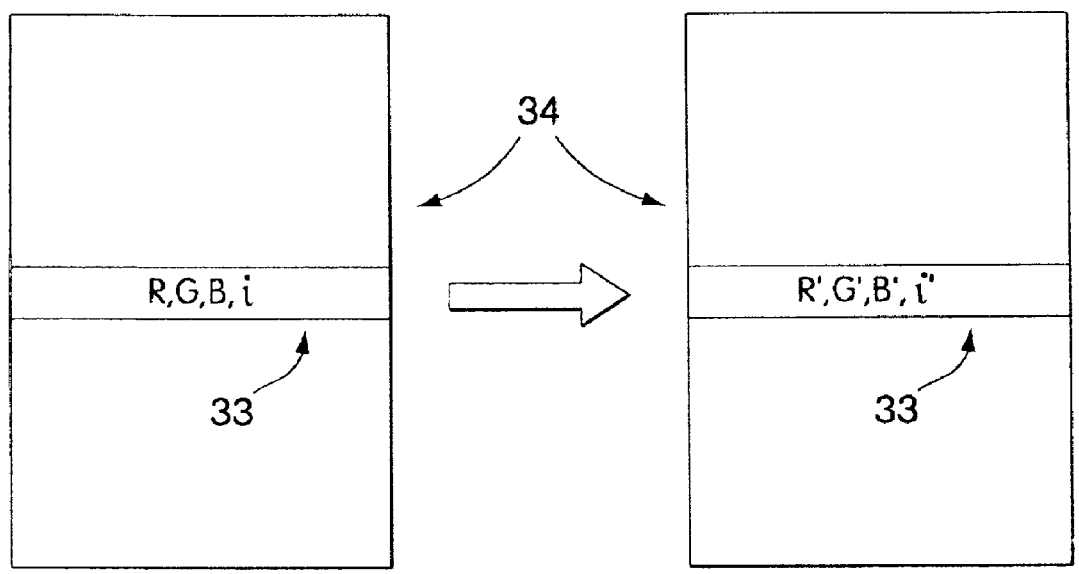
FIG. 4 illustrates a modification of the hash table when a collision between two discrete RGB values occurs.
Figure 5:
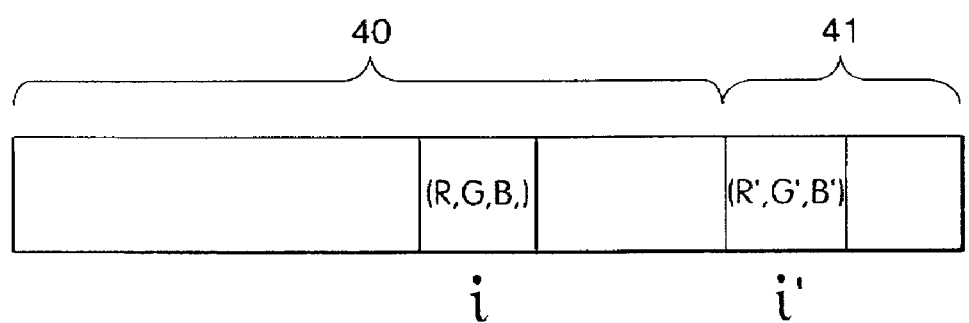
FIG. 5 illustrates the storing of a hash value index when a collision occurs between two discrete RGB values.

In some instances, a collision occurs when performing the "hash" function, where a new and different R'G'B' combination produces the same HASH( ) value as a previous RGB, and leads to a table entry 33 that is already in use from a previous RGB. When this occurs, the hash table entry is re-used, and the new R'G'B' value is stored in the hash table 34 at the same index "i". The modification of the hash table 34 when a collision occurs is illustrated in FIG. 4a. As shown in FIG. 4b, a portion 40 of the input palette array has been filled with data, leaving an unfilled portion 41 in the input palette array. In the case of a collision, the next available, unused index (i') within the unused portion 41 of the input palette 35 is used to store the new R'G'B' data. The old index (i) for the previously computed RGB remains valid. The hash function in the illustrated embodiment of the invention is designed to minimize collisions among neighboring RGB values.

The input palette 35 stores colors as they occur, and in the order in which they occur in the input image raster 31. The conversion of the input palette data to data in the output palette may occur after several rasters of input image data have been mapped to the input palette. However, if the input palette 35 reaches its capacity (all indices are filled), the palette must be flushed. Therefore, before each raster is read, the available amount of space in the input palette is verified. If there is room for a complete raster to be mapped, then the process continues. If not, the palette must be converted, cleared and re-filled with mapped image data.

There are numerous variations and modifications to the accelerated conversion process. For examples it is possible to modify the length of the input and output palettes to store more values. According to a preferred embodiment, both the input palette and the output palette are eight times the length of the original raster. However, this ratio may be adjusted according to the desired preferences of the user and the parameters of the system. Alternate hash functions may also be used. The hash function may be modified to use a different number of color components. In a grey-scale color space, there is only one color component (white), rather than the three used in the RGB color space. In addition, the size of the hash table (the cache size) could be altered to create a different range. It is important to note that the number of entries must be a power of two. For example, in the preferred embodiment, the hash table has 256 ($2^8$) entries, yet in an alternate embodiment of the invention, the hash table can be expanded to 512 entries ($2^9$). As discussed, the color spaces are not limited to RGB, RGBX, CMY, CMYK or grey scale color spaces. Furthermore, the color spaces are not limited to 8-bit components. For example, a 16-bit RGB may be utilized.

The illustrated embodiments of the present invention provide a streamlined color conversion process for image data. The invention is particularly advantageous for systems that require exceptionally involved and complex color conversion, or for large graphic images with only a limited number of different colors. For these systems, colors that are repeated in the input image are first sorted and cached together so that they may be converted with a single conversion calculation, rather than having to repeat the calculation for each pixel. By reducing the number of conversion calculations, the invention accelerates the complicated and time-consuming conversion process.

Accordingly, the present invention is not limited to the described embodiments. Those skilled in the art will appreciate that various changes in form and detail may be made without departing from the intended scope of the present invention as defined in the appended claims.

What is claimed is:

1. In an electronic device, a method, comprising the steps of:
    providing input color data for a group of pixels in an input color space, wherein one or more pixels contain input color data that is repeated;
    building an intermediate table for storing the input color data for each pixel in the group, wherein each different input color data corresponding to a pixel in the group is assigned an index in the intermediate table and wherein the index is a hash function of the different input color data;
    storing the indices in an index array, wherein each index is stored at a position corresponding to a position in the input color data of the input color data assigned to the index;
    building an intermediate palette for storing the input color data corresponding to the indices, wherein each input color data appears once in the intermediate palette;
    converting the color data in the intermediate palette to an output color data in an output color space, wherein the same input color data in different pixels is converted once to avoid repeated conversion calculations for the different pixels having the same input color data; and
    for each pixel in the group of pixels substituting the corresponding converted output color data for each input color data.

2. The method of claim 1 further comprising repeating for each of multiple groups of pixels in the input color space the steps of providing, building an intermediate table, storing, building an intermediate palette, converting, and substituting.

3. The method of claim 1 wherein the input color space comprises a (R, G, B) color space.

4. The method of claim 3 wherein the output color space comprises a (C, M, Y, K) color space.

5. The method of claim 3 wherein the output color space comprises a (C, M, Y) color space.

6. The method of claim 1 wherein the input color space comprises a grey scale color space.

7. The method of claim 1 wherein the output color space comprises a grey scale color space.

8. The method of claim 1 wherein the electronic device is a computer system.

9. The method of claim 1 wherein the electronic device is an image-reproducing apparatus.

10. The method of claim 1 wherein the electronic device is a copier.

11. The method of claim 1 wherein the electronic device is a printer.

12. The method of claim 1 wherein the group of pixels comprises a row of pixels.

13. In an electronic device, a method, comprising the steps of:
    providing a set of input color data for pixels, said input color data encoding colors for the pixels in a first color space, wherein one or more pixels contain same color data that is repeated;
    for each of the pixels, determining an index for the pixel based on the color data for the pixel;
    building an intermediate table for assigning an index to the input color data, wherein the indices of the same input color data are the same and wherein the index is a hash function of the input color data;
    storing the indices in an index array, wherein each index is stored at a position corresponding to a position in the input color data;
    building an intermediate palette for storing the input color data corresponding to the indices, wherein each input color data appears once in the intermediate palette;
    converting the input color data in the intermediate palette into an output color data in a second color space, wherein the same input color data in different pixels is converted once to avoid repeated conversion calculations for the different pixels having the same input color data; and
    for each pixel, substituting the corresponding converted output color data for each input color data.

14. The method of claim 13 wherein one of the first color space and the second color space is a (R, G, B) color space.

15. The method of claim 13 wherein one of the first color space and the second color space is a grey scale color space.

16. The method of claim 13 wherein one of the first color space and the second color space is a (C, M, Y, K) color space.

17. The method of claim 13, wherein the method is performed by a processor.

18. A device for converting a set of input color representations of pixels in an image wherein the input color representations are ordered in the set in an order of the pixels in the image, comprising:
    a storage facility for storing an intermediate table, wherein the intermediate table holds, at indexed locations, the input color representations and wherein the index of each location is a hash function of the input color representation stored at the location;
    a storage facility for storing an index array, the index array storing the indices, wherein each index is stored at a position in the index array corresponding to a position of the color representations in the set, that when hashed result in the index;

a storage facility for storing an intermediate palette, the intermediate palette storing the input color representations corresponding to the indices, wherein each input color representations appears once in the intermediate palette; and a conversion facility for converting the set of input color representations in the intermediate palette to output color representations in a second color space, wherein the same input color representation of different pixels is converted once to avoid repeated conversion calculations for the different pixels having the same input color representation.

19. The device of claim 18 wherein the conversion facility is implemented by a processor.

20. An improved method of converting color image data for a group pixels from a first color space to a second color space, comprising:

mapping input color image data for the group of pixels in the first color space to indices, wherein the input color image data is stored in an intermediate table at positions of the indices and wherein each index is a hash function of input color image data of a pixel in the group;

storing the indices in an index array, wherein each index is stored at a position corresponding to a position in the input color data;

building an intermediate palette for storing the input color data corresponding to the indices, wherein each input color data appears once in the intermediate palette;

converting the input color image data in the intermediate palette to an output color image data in the second color space, wherein the same input color image data in different pixels is converted once to avoid repeated conversion calculations for the different pixels having the same input color image data;

reconstructing the group of pixels in the second color space using the corresponding output color image data.

21. The method of claim 20, further comprising repeating for each of multiple groups of pixels the steps of mapping, storing, building, converting and reconstructing.

22. The method of claim 20, wherein positions of indices in the index array correspond to pixel locations in the group of pixels.

23. The method of claim 20 wherein the first color space comprises a (R, G, B) color space.

24. The method of claim 20 wherein the second color space comprises a (C, M, Y, K) color space.

25. The method of claim 20 wherein the second color space comprises a (C, M, Y) color space.

26. The method of claim 20 wherein the first color space comprises a grey scale color space.

27. The method of claim 20 wherein the second color space comprises a grey scale color space.

* * * * *

UNITED STATES PATENT AND TRADEMARK OFFICE
CERTIFICATE OF CORRECTION

| | | |
|---|---|---|
| PATENT NO. | : 7,443,544 B2 | Page 1 of 1 |
| APPLICATION NO. | : 10/000461 | |
| DATED | : October 28, 2008 | |
| INVENTOR(S) | : Peter Waksman | |

It is certified that error appears in the above-identified patent and that said Letters Patent is hereby corrected as shown below:

In column 2, line 66, delete "multileveled" and insert -- multi-leveled --, therefor.

In column 3, line 24-25, delete "computergenerated" and insert -- computer-generated --, therefor.

Signed and Sealed this

Tenth Day of February, 2009

JOHN DOLL
*Acting Director of the United States Patent and Trademark Office*